United States Patent [19]
Farmont

[11] Patent Number: 5,437,901
[45] Date of Patent: Aug. 1, 1995

[54] PARKING CARD FOR THE CHARGE-RELATED ACTUATION OF A PARKING BARRIER

[76] Inventor: Johann Farmont, Talstrasse 1, 40217 Dusseldorf, Germany

[21] Appl. No.: 176,956

[22] Filed: Jan. 3, 1994

Related U.S. Application Data

[63] Continuation-in-part of Ser. No. 84,545, Jun. 29, 1993, abandoned.

Foreign Application Priority Data

Oct. 21, 1993 [DE] Germany .............. 9316028 U

[51] Int. Cl.⁶ .............................................. B32B 9/00
[52] U.S. Cl. ................................. 428/64.2; 428/900; 428/915; 428/928; 235/380; 235/449; 235/493
[58] Field of Search ............ 428/64, 900, 915, 928; 235/380, 449, 493

[56] References Cited

U.S. PATENT DOCUMENTS

| | | | |
|---|---|---|---|
| 3,766,452 | 10/1973 | Burpee et al. | 317/262 R |
| 4,101,701 | 7/1978 | Gordon | 428/189 |
| 4,380,699 | 4/1983 | Monnier | 235/492 |
| 4,395,043 | 7/1983 | Gargione | 317/262 R |
| 4,585,930 | 4/1986 | Casden | 235/486 |
| 4,674,618 | 6/1987 | Eglise et al. | 194/210 |
| 4,788,102 | 11/1988 | Koning et al. | 428/915 |
| 4,960,983 | 10/1990 | Inoue | 235/449 |
| 4,982,070 | 1/1991 | Bezin | 235/378 |
| 4,990,759 | 2/1991 | Gloton | 235/492 |
| 5,206,495 | 4/1993 | Kreft | 235/492 |
| 5,208,110 | 5/1993 | Smith et al. | 428/414 |

FOREIGN PATENT DOCUMENTS

| | | |
|---|---|---|
| 2625351 | 6/1989 | France . |
| 2926867 | 1/1981 | Germany . |
| 3608165 | 9/1986 | Germany . |
| 391375 | 9/1990 | Germany . |
| 60-215288 | 10/1985 | Japan . |
| 654942 | 3/1982 | Switzerland . |
| 124 | of 1854 | United Kingdom . |
| 89/12286 | 12/1989 | WIPO . |
| 91/14237 | 9/1991 | WIPO . |

*Primary Examiner*—Patrick J. Ryan
*Assistant Examiner*—Kam F. Lee
*Attorney, Agent, or Firm*—Steven F. Caserza; Flehr Hohbach Test Albritton & Herbert

[57] ABSTRACT

The invention relates to a parking card to operate a barrier for pay parking. To create a parking card which is of simple and robust construction the parking card has a peripheral border region with a radially outwardly tapering thickness.

6 Claims, 1 Drawing Sheet

PARKING CARD FOR THE CHARGE-RELATED ACTUATION OF A PARKING BARRIER

RELATED APPLICATIONS

This application is a Continuation-in-Part application of U.S. Ser. No. 08/084,545, filed Jun. 29, 1993, now abandoned. Additional related applications are as follows:

| U.S. Ser. No. | Filing Date |
| --- | --- |
| 08/177,007 | January 3, 1994 |
| 08/177,002 | January 3, 1994 |
| 08/177,006 | January 3, 1994 |
| 08/196,648 | February 15, 1994 |
| 08/309,093 | September 20, 1994 |

BACKGROUND OF THE INVENTION

1. Field of the Invention

The invention relates to a parking card for the charge-related actuation of a parking barrier.

2. Description of the Prior Art

A round, sheet-like parking card of this kind has a multiplicity of advantages in terms of its handling since it is possible not only for it to be re-used for different users of multi-storey car parks or open-air car parks, but also for it to be separated in a simple manner each time it is issued. Furthermore, the rolling capacity when transporting a parking card of this type to identification and communication stations can be used for proceeding with the parking operation.

It has, however, proved disadvantageous that, depending on the accuracy of manufacture and/or the degree of wear or soiling, the flat parking card with a planar circumferential surface may tend to stick to other parking cards on removal from a parking-card stack of parking cards located one upon the other, i.e. on the separation operation. Furthermore, obstructions reducing the sliding capacity along the disc surface can accumulate on the front/rear sides of the parking cards.

The object of the invention is thus to create a parking card which is of simple and robust construction.

SUMMARY OF THE INVENTION

The invention concerns a parking card to operate a barrier for pay parking. The card is in the form of a round, flat piece which has a border portion which does not make contact with the parking card located directly above and beneath. An underside or top-side removal of the parking card from a stack is simplified in this manner.

In this arrangement, a slightly concave or slightly convex configuration of the front side and rear side of the parking card can reduce the bearing surface between neighbouring parking cards. The risk of stacked parking cards sticking on one another is reduced in this way.

Further embodiments of the invention can be gathered from the following description.

BRIEF DESCRIPTION OF THE DRAWINGS

The invention is illustrated in more detail hereinbelow with reference to the exemplary embodiments shown in the accompanying drawings, in which.

DETAILED DESCRIPTION OF A PREFERRED EMBODIMENT

Figure 1:
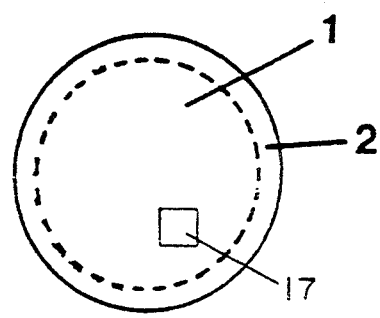
FIG. 1 shows, schematically, a plan view of a first exemplary embodiment of a parking card.
Figure 2:
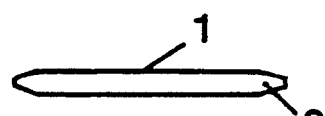
FIG. 2 shows, schematically, a vertical section of the parking card according to FIG. 1.

FIGS. 1 and 2 show a first exemplary embodiment of a parking card which is intended for the charge-related actuation of a parking barrier and comprises a round, sheet-like plastic piece 1 which has a peripheral border region 2 which tapers radially outwards. The sheet-like plastic piece 1 has an integrated electronic component 17 for the repeated and position-independent storing and, if appropriate, processing of user-specific parking information, such as, in particular, entrance time and departure time.

According to FIG. 2, the border region 2 of the parking card has a frustoconical contour which provides the round plastic piece 1 with chamfered circumferential border surfaces.

Figure 3:
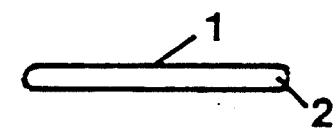
FIG. 3 shows, schematically, a vertical section of a second exemplary embodiment of a parking card.

According to FIG. 3, the border region 2 of the parking card has an arcuate contour.

In the case of the two exemplary embodiments shown in FIGS. 2 and 3, the border region 2 provides the plastic piece 1 with a convex, wheel-like circumferential surface.

Figure 4:
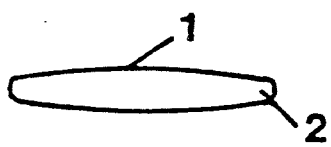
FIG. 4 shows, schematically, a vertical section of a third exemplary embodiment of a parking card.

The third exemplary embodiment shown in FIG. 4 shows a parking card with a convexly shaped front side and rear side. The border region 2 is configured in the same way as has been described for FIG. 3, but it can also be designed as shown in FIG. 2.

Figure 5:
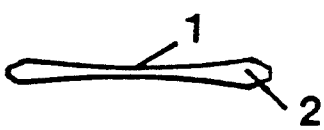
FIG. 5 shows, schematically, a vertical section of a fourth exemplary embodiment of a parking card.

The fourth exemplary embodiment shown in FIG. 5 shows a parking card with a concavely configured front side and rear side. The border region 2 is configured in the same way as has been described for FIG. 2, but it can also be designed as shown in FIG. 3.

Although the invention has been described in connection with what is presently considered to be the most practical and preferred embodiments, it is to be understood that the invention is not limited to the disclosed embodiments, but rather, is intended to cover various modifications and equivalent arrangements included within the spirit and scope of the appended claims.

I claim:

1. A parking card for the charge-related actuation of a parking barrier comprising:
   a round plastic piece having a front side and a rear side;
   an integrated electronic component formed within said plastic piece for the storing of parking information;
   a peripheral border region of said plastic piece with a radially outwardly tapering thickness.

2. A parking card according to claim 1, wherein the peripheral border region has a frustoconical contour.

3. A parking card according to claim 1, wherein the peripheral border region has an arcuate contour.

4. A parking card according to claim 1, wherein the front side and rear sides of the plastic piece are designed either in a slightly concave or slightly convex manner.

5. A parking card as in claim 1 wherein said integrated electronic component comprises processing circuitry for the processing of said parking information.

6. A parking card as in claim 1 wherein said parking information is user specified.

* * * * *